(No Model.)
L. C. BEEBE.
GAS GENERATOR.
No. 290,627. Patented Dec. 18, 1883.
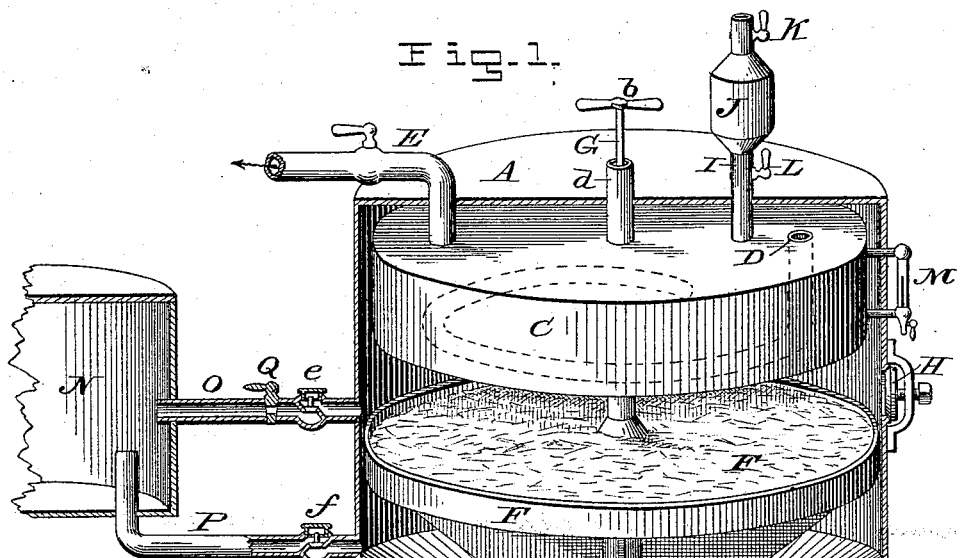
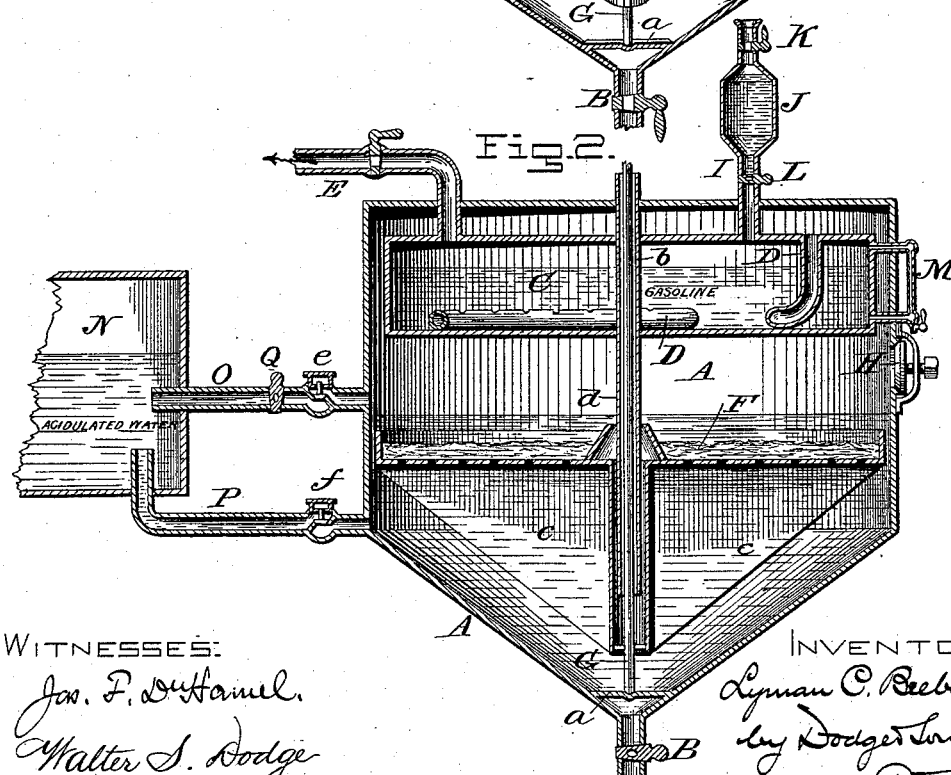
WITNESSES:
Jas. F. DuHamel.
Walter S. Dodge
INVENTOR:
Lyman C. Beebe,
by Dodge Son,
Attys.

United States Patent Office.

LYMAN C. BEEBE, OF VILLISCA, ASSIGNOR OF ONE-HALF TO R. TRUMAN, OF AFTON, IOWA.

GAS-GENERATOR.

SPECIFICATION forming part of Letters Patent No. 290,627, dated December 18, 1883.

Application filed October 11, 1883. (No model.)

*To all whom it may concern:*

Be it known that I, LYMAN C. BEEBE, of Villisca, in the county of Montgomery and State of Iowa, have invented certain Improvements in Gas-Generators, of which the following is a specification.

My invention relates to gas-generators for producing illuminating-gas; and it consists in various details and features, hereinafter fully explained, whereby the apparatus is rendered simple in construction and efficient in operation.

In the accompanying drawings, Figure 1 represents a perspective view of my improved generator, partly broken away or in section; Fig. 2, a vertical central section of the same.

The object of my invention is to provide a cheap and simple apparatus for producing illuminating-gas, which shall be free from danger in use and readily kept in proper working order. To this end I construct the apparatus as shown in the annexed drawings, in which—

A represents a tank or vessel of suitable form and material, having a conical bottom, and provided at the apex of the cone or conical bottom with a cock, B, by which dross and sediment may be drawn off.

Within the tank A, near the top thereof, I place a gasoline-tank, C, within which is coiled a pipe, D, the body of which is perforated and rests upon the bottom of the tank, while one end of said pipe is bent upward and has its open end passed through and carried flush with or slightly above the top of the gasoline-tank, as shown in both figures. This pipe serves to admit the hydrogen gas generated in vessel A into the gasoline-tank, at or near its bottom, whence it travels upward through the gasoline, taking up a portion thereof and being enriched thereby, and finally passing out through pipe E to the building or structure where the gas is to be burned.

Below the gasoline-tank C, and likewise within the vessel A, is a basket, F, perforated to permit the acidulated water, with which the vessel A is supplied, to pass through it freely, but having perforations sufficiently small to prevent the iron or zinc scraps with which said basket is supplied from falling through them. This basket F is carried by a central vertical rod or spindle, G, the lower end of which is suitably supported upon a step or bearing, a, and the upper end of which is carried above the top of vessel A and furnished with a cross-handle, b, by which it may be conveniently rotated, the basket being rigidly secured to said rod, and consequently turning therewith. Beneath the basket are secured sheet-copper braces c, which serve both to support and steady the basket, and as blades or fans to stir up or agitate the acidulated water of vessel A when the basket is rotated, as above mentioned, this agitation being necessary from time to time to prevent the separation of the acid and water and the settling of the acid at the bottom, which is liable to take place to a greater or less extent. The opening through which the rod or spindle enters chamber A is suitably packed to render it gas-tight, and the gasoline-tank is formed with a central walled opening, d, through which the rod passes, as shown.

A man-hole is formed in one side of vessel A to permit an examination of the interior at any time, and to permit the supply of iron or zinc scraps in basket F to be replenished when necessary, a cover, H, being provided to close said man-hole when the generator is in action.

For the purpose of supplying the gasoline-tank a filling-tube, I, is provided, and in order to render the filling operation perfectly safe and to insure the proper supply the tube I is enlarged to form a gasoline holder or tank, J, and is furnished above and below said tank with stop-cocks K and L. The mouth or upper end of the tube is made flaring or funnel-shaped to facilitate pouring into it.

When it is desired to supply the gasoline-tank C, the lower stop-cock, L, is closed and upper cock, K, is opened. Gasoline is then poured into the holder J through its funnel-mouth until the holder is filled, said holder being made of a size to contain one charge for the tank C, or a predetermined and definite portion of such charge, so that the holder J serves also as a measure. When the holder J is filled, the lower cock, K, is opened and the gasoline flows into tank C, whereupon cock L is again closed and the holder refilled and cock K closed, leaving the holder charged and ready to replenish tank C, but protecting its contents against evaporation, and also against accceidental ignition.

In order to show at all times the height of the gasoline in tank C, a glass gage-tube, M, connected with the upper and lower portions of said tank by short horizontal tubes, is arranged at the outside of vessel A, as shown.

N represents a tank or reservoir supplied with acidulated water, and communicating with the interior of vessel A by two tubes or pipes, O and P, the former entering the chamber above basket F and provided with a stop-cock, Q, and with an inwardly-opening check-valve, $e$, the latter pipe, P, entering chamber A below the basket F, and furnished with an outwardly-opening check-valve, $f$. This arrangement of pipes and valves renders the apparatus self-acting in the following manner: Gasoline-tank C is supplied with gasoline, and vessel A is supplied with acidulated water through pipe O from reservoir N, the iron or zinc scraps having been placed in basket F. The acidulated water, rising above or into basket F, acts upon the materials therein and generates hydrogen gas, which, being light and soon acquiring a slight pressure, finds its way into the mouth of tube or pipe D and issues through its perforations directly into the body of gasoline in tank C, through which it ascends, finally passing off through pipe E to the point of use. If the production exceeds the consumption, or if the flow through pipe E be closed off, the increase of pressure in chamber A forces the acidulated water through pipe P and back into tank or reservoir N, at the same time closing the check-valve in pipe O, and thus preventing the return of the water so long as the pressure continues. When, however, the gas is allowed to pass off through pipe E, the pressure soon decreases sufficiently to allow the return of the acidulated water through pipe O, again raising it to or above the level of the basket F, below which it is forced by excessive pressure, and by such restoration again putting the generator into operation.

It will of course be understood that instead of iron or zinc other suitable materials capable of giving off hydrogen when acted upon by acidulated water may be used; that the wings or braces $c$ may be made of any material capable of withstanding the action of the acid, and that the same is true of other parts of the apparatus.

I also wish it understood that although I have shown and described two pipes, O and P, between the generator and the acidulated-water chamber or reservoir, provided, respectively, with inwardly and outwardly opening check-valves, I may use a single pipe without a check-valve, but advisably furnished with a simple cut-off valve or cock.

I am aware that it is not broadly new to provide means for agitating the acidulated water from outside the apparatus, and do not make broad claim thereto.

Having thus described my invention, what I claim is—

1. A gas generating and carbureting apparatus consisting of acidulated-water vessel A, gasoline-tank C, pipe D, and outlet-pipe E, basket F, provided with wings $c$, and spindle G, acidulated-water reservoir N, and pipes O P, respectively provided with inwardly and outwardly opening check-valves, all substantially as shown.

2. In combination with generating-chamber A, and with carbureting-chamber C in the upper part thereof, provided with central tube, $d$, the basket F below the carbureting-chamber, and provided with spindle G, passing through tube $d$, and extending above the vessel A, as and for the purpose explained.

3. In combination with generator A, acidulated-water reservoir N, connected therewith by tubes or pipes O P, provided, respectively, with inwardly and outwardly opening check-valves, the pipe O entering chamber A above and pipe P entering the same below basket F, substantially as described and shown.

4. The herein-described apparatus for the manufacture of illuminating-gas, consisting of acidulated-water vessel A, gasoline-tank C, pipe D, and outlet-pipe E, basket F, acidulated-water reservoir N, and pipes O P, respectively provided with inwardly and outwardly opening check-valves, all substantially as shown and described.

LYMAN C. BEEBE.

Witnesses:
W. L. EVES,
E. C. GIBBS.